(12) United States Patent
Chen et al.

(10) Patent No.: US 8,466,911 B2
(45) Date of Patent: Jun. 18, 2013

(54) LOW VOLTAGE DIFFERENTIAL SIGNAL OUTPUT STAGE

(75) Inventors: Hsiang-Chih Chen, Taipei (TW); Tung-Cheng Hsin, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 642 days.

(21) Appl. No.: 12/623,448

(22) Filed: Nov. 23, 2009

(65) Prior Publication Data

US 2011/0050681 A1    Mar. 3, 2011

(30) Foreign Application Priority Data

Aug. 27, 2009   (TW) .............................. 98128908 A

(51) Int. Cl.
*G06F 3/038* (2006.01)
*G09G 5/00* (2006.01)

(52) U.S. Cl.
USPC .......................................... 345/214; 345/213

(58) Field of Classification Search
None
See application file for complete search history.

(56) References Cited

U.S. PATENT DOCUMENTS

| 6,515,271 | B1 | 2/2003 | Shimizu |
| 7,295,177 | B2 * | 11/2007 | Shigeta et al. .................. 345/87 |
| 2007/0263122 | A1 | 11/2007 | Araki |
| 2007/0296617 | A1 | 12/2007 | Murata et al. |

OTHER PUBLICATIONS

"Office Action of Taiwan Counterpart Application", issued on Sep. 12, 2012, p. 1-p. 4, in which the listed references were cited.

* cited by examiner

*Primary Examiner* — Daniell L Negron
(74) *Attorney, Agent, or Firm* — Jianq Chyun IP Office

(57) ABSTRACT

A low voltage differential signal (LVDS) output stage including a display signal digital circuit, a data parallel-to-serial (P2S) circuit and a transmitting circuit is provided. The display signal digital circuit generates a display signal and a display clock signal synchronous to each other according to a first frequency multiplication clock signal. The data P2S circuit samples the display signal according to a second frequency multiplication clock signal, so as to generate a serial data signal and a serial clock signal. The first frequency multiplication clock signal and the second frequency multiplication clock signal have a relationship of frequency multiplication. The data P2S circuit includes an adjustment structure for adjusting the serial clock signal according to the display clock signal and the second frequency multiplication clock signal, and controlling a transmitting time of the serial data signal transmitted according to a clock of the second frequency multiplication clock signal.

6 Claims, 4 Drawing Sheets

LOW VOLTAGE DIFFERENTIAL SIGNAL OUTPUT STAGE

CROSS-REFERENCE TO RELATED APPLICATION

This application claims the priority benefit of Taiwan application serial no. 98128908, filed on Aug. 27, 2009. The entirety of the above-mentioned patent application is hereby incorporated by reference herein and made a part of specification.

BACKGROUND OF THE INVENTION

1. Field of the Invention

The present invention relates to an output stage. More particularly, the present invention relates to a low voltage differential signal output stage.

2. Description of Related Art

FIG. 1 is a block diagram illustrating a conventional low voltage differential signal (LVDS) output stage. Referring to FIG. 1, the LVDS output stage 100 includes a display signal digital circuit 110, a display phase-locked loop (PLL) 120, a data parallel to serial (P2S) circuit 130 and a LVDS transmitting circuit 140.

The display PLL 120 locks a phase of a multiply-by-1 frequency multiplication display clock signal 112 transmitted from the display signal digital circuit 110, and multiplies the frequency by 7 to generate a multiply-by-7 frequency multiplication display clock signal 122. Thereafter, the data P2S circuit 130 simultaneously receives the multiply-by-1 frequency multiplication display clock signal 112, the multiply-by-7 frequency multiplication display clock signal 122 and display digital data (for example, a horizontal sync signal hs, a vertical sync signal vs, a data enable signal de, and a three basic color signal rgb), and performs a P2S operation to the display digital data hs, vs, de and rgb. Then, the serialized display digital data hs, vs, de and rgb are transmitted to the LVDS transmitting circuit 140 to achieve a high speed LVDS format transmission.

FIG. 2 is a block diagram illustrating the data P2S circuit 130 of FIG. 1. Referring to FIG. 2, a fixed value frequency divider 210 (divided-by-7) divides the multiply-by-7 frequency multiplication display clock signal 122 by 7, and generates a multiply-by-1 frequency multiplication transmission clock signal 212. Then, the transmission clock signal 212 is transmitted to the LVDS transmitting circuit 140 to serve as an output of a final clock signal. Moreover, during a dividing process of the fixed value frequency divider 210, the fixed value frequency divider 210 generates a load signal ld according to the display clock signal 112. The load signal ld is generated every 7 clock cycles of the multiply-by-7 frequency multiplication display clock signal 122, and triggers the data P2S circuit 220 to serialize the display digital data hs, vs, de and rgb to generate a serial data signal 222 (a display data signal output with a multiply-by-7 frequency multiplication). Then, the serial data signal 222 is output to the LVDS transmitting circuit 140 to complete the whole conversion operation of P2S.

Referring to FIG. 1 and FIG. 2 again, in a structure of the LVDS output stage 100, there is a phase locking relationship between the multiply-by-7 frequency multiplication display clock signal 122 and the multiply-by-1 frequency multiplication display clock signal 112, and there is a sync relationship between the display digital data hs, vs, de, rgb and the multiply-by-1 frequency multiplication display clock signal 112. Therefore, the data P2S circuit 220 can securely complete the data P2S operation by only referring to the multiply-by-1 frequency multiplication display clock signal 112 and selecting a suitable load signal ld.

In addition, the display PLL 120 is a conventional PLL, and a design thereof is more complicated than a frequency synthesizer, and limitations of the display PLL 120 are relatively more. Moreover, to ensure an output signal of the LVDS output stage 100 achieving a function of reducing a system electromagnetic interference (EMI), the display PLL 120 is generally required to have a spread spectrum output function. According to the conventional method, if the display PLL 120 has the spread spectrum output function, two PLLs are generally required to be connected in serial, which may increase a cost of the circuit, and the whole circuit structure is complicated and is lack of flexibility.

SUMMARY OF THE INVENTION

The present invention is directed to a low voltage differential signal (LVDS) output stage, which may have a simple and flexible circuit design, and accordingly a fabrication cost of the whole circuit is reduced.

The present invention provides a LVDS output stage including a display signal digital circuit, a data parallel-to-serial (P2S) circuit and a transmitting circuit. The display signal digital circuit generates a display signal and a display clock signal synchronous to each other according to a first frequency multiplication clock signal. The data P2S circuit samples the display signal according to a second frequency multiplication clock signal, so as to generate a serial data signal and a serial clock signal. Wherein, the first frequency multiplication clock signal and the second frequency multiplication clock signal have a relationship of frequency multiplication. The data P2S circuit includes an adjustment structure, which is for adjusting the serial clock signal according to the display clock signal and the second frequency multiplication clock signal, and controlling a transmitting time of the serial data signal transmitted according to a clock of the second frequency multiplication clock signal. The transmitting circuit is connected to the data P2S circuit, and is used for outputting the serial data signal and the serial clock signal to serve as outputs of the LVDS output stage.

In an embodiment of the present invention, the LVDS output stage further includes a frequency multiplier, which is for generating the first frequency multiplication clock signal and the second frequency multiplication clock signal according to a reference clock.

The present invention provides a LVDS output stage including a frequency multiplier, a display signal digital circuit, a data P2S circuit and a transmitting circuit. The frequency multiplier is used for generating a first frequency multiplication clock signal and a second frequency multiplication clock signal according to a reference clock, wherein the first frequency multiplication clock signal and the second frequency multiplication clock signal have a relationship of frequency multiplication. The display signal digital circuit generates a display signal and a display clock signal synchronous to each other according to the first frequency multiplication clock signal. The data P2S circuit samples the display signal according to the second frequency multiplication clock signal and the display clock signal, so as to generate a serial data signal and a serial clock signal, where the data P2S circuit further feeds back a phase adjusting signal to the frequency multiplier for adjusting a phase of the generated first frequency multiplication clock signal, so as to adjust a phase of the display clock signal. The transmitting circuit is connected to the data P2S circuit, and is used for outputting the serial data signal and the serial clock signal to serve as outputs of the LVDS output stage.

The present invention provides a LVDS output stage including a display signal digital circuit, a display phase-locked loop (PLL), a data P2S circuit and a transmitting circuit. The display signal digital circuit receives a display signal and generates a display signal and a display clock signal synchronous to each other. The display PLL is for receiving the display clock signal, and outputting a first frequency multiplication clock signal and a second frequency multiplication clock signal synchronous to each other after a phase locking operation, where the first frequency multiplication clock signal and the second frequency multiplication clock signal have a relationship of frequency multiplication. The data P2S circuit samples the display signal according to the second frequency multiplication clock signal, so as to generate a serial data signal and a serial clock signal. The transmitting circuit is connected to the data P2S circuit, and is used for outputting the serial data signal and the serial clock signal to serve as outputs of the LVDS output stage.

The present invention provides a LVDS output stage including a display signal digital circuit, a display PLL, a data P2S circuit with a phase correction function and a transmitting circuit. The display signal digital circuit receives a display signal and generates a display signal and a first frequency multiplication clock signal synchronous to each other. The display PLL i receives the first frequency multiplication clock signal, and outputs a second frequency multiplication clock signal after a phase locking operation, where the first frequency multiplication clock signal and the second frequency multiplication clock signal have a relationship of frequency multiplication. The data P2S circuit with the phase correction function samples the display signal according to the second frequency multiplication clock signal, so as to generate a serial data signal and a serial clock signal. The data P2S circuit with the phase correction function includes an adjustment structure, which is used for adjusting phases of the first frequency multiplication clock signal and the second frequency multiplication clock signal, and accordingly adjusting the serial clock signal, and controlling a transmitting time of the serial data signal transmitted according to a clock of the second frequency multiplication clock signal. The transmitting circuit is connected to the data P2S circuit, and is used for outputting the serial data signal and the serial clock signal to serve as outputs of the LVDS output stage.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The present invention provides a low voltage differential signal (LVDS) output stage, in which a prototype display phase-locked loop (PLL) is changed to a frequency multiplier, for example, a display frequency synthesizer circuit, which can be configured to the output stage or provided by a system. In such structure, an original function of the display PLL is achieved by the frequency multiplier and a novel data parallel to serial (P2S) circuit, wherein the frequency multiplier is in charge of generating a required frequency, and the data P2S circuit is in charge of dynamically determining a phase, i.e. the data P2S circuit has an automatic phase correction function to obtain the required phase. The frequency multiplier also has a spread spectrum output function. Therefore, the whole structure is simple and flexible, and meanwhile a system cost is reduced.

The LVDS output stages of the present invention are described in detail below.

Figure 3:
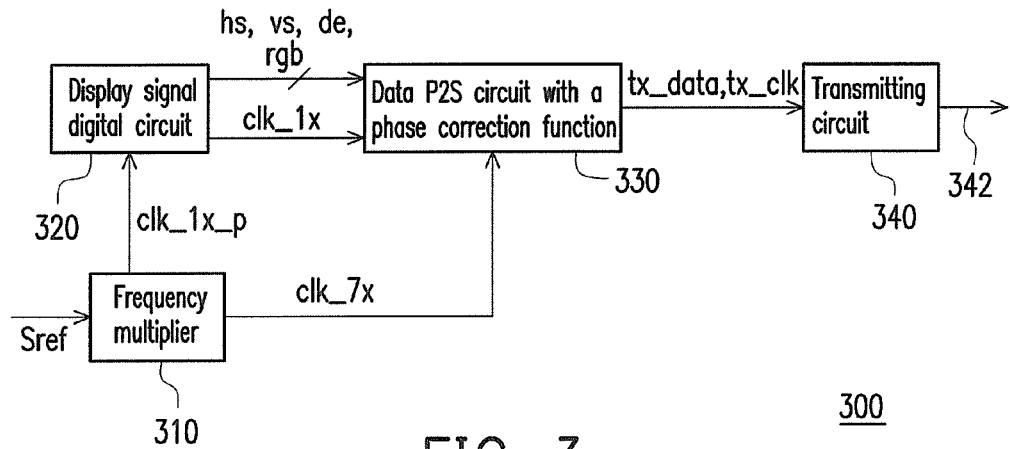
FIG. 3 is a block diagram illustrating a LVDS output stage according to an embodiment of the present invention.

FIG. 3 is a block diagram illustrating a LVDS output stage according to an embodiment of the present invention. Referring to FIG. 3, the LVDS output stage 300 includes a frequency multiplier 310, a display signal digital circuit 320, a data P2S circuit with a phase correction function 330, and a transmitting circuit 340.

The frequency multiplier 310 receives a reference clock signal (referred to as Sref hereinafter), and generates a first frequency multiplication clock signal clk_1x_p and a second frequency multiplication clock signal clk_7x. In the present embodiment, the first frequency multiplication clock signal clk_1x_p is a multiply-by-1 frequency synthesized signal, and the second frequency multiplication clock signal clk_7x is a multiply-by-7 frequency synthesized signal. As described above, the reference clock signal Sref can be a clock signal provided to the display signal digital circuit by a former stage (for example, dp_clk of FIG. 1), or can be an independent reference clock generated by the system, which can all be applied to the output stage structure of the present embodiment.

The display signal digital circuit 320 is coupled to the frequency multiplier 310, and receives the first frequency multiplication clock signal clk_1x_p to generate display signals hs, vs, de, rgb and a display clock signal clk_1x, and respectively transmits these signals to the data P2S circuit with the phase correction function 330.

The data P2S circuit with the phase correction function 330 is coupled to the frequency multiplier 310 and the display signal digital circuit 320, and samples the display signals hs, vs, de and rgb according to the second frequency multiplication clock signal clk_7x and the display clock signal clk_1x, so as to generate a serial data signal tx_data and a serial clock signal tx_clk. The transmitting circuit 340 is coupled to the data P2S circuit with the phase correction function 330, and receives the serial data signal tx_data and the serial clock signal tx_clk to generate an output signal 342, so as to achieve a high-speed transmission. In the present embodiment, the serial data signal tx_data is transmitted with a multiply-by-7 frequency, the serial clock signal tx_clk is transmitted with a multiply-by-1 frequency, and time points for transmitting the serial data signal tx_data and the serial clock signal tx_clk are matched.

Regarding a whole operation, the frequency multiplier 310 receives the reference clock signal Sref, and performs frequency synthesizations to generate the first frequency multiplication clock signal (multiply-by-1 frequency synthesized signal) clk_1x_p and the second frequency multiplication clock signal (multiply-by-7 frequency synthesized signal) clk_7x according to the reference clock signal Sref. Then, the first frequency multiplication clock signal clk_1x_p and the second frequency multiplication clock signal clk_7x are respectively provided to the display signal digital circuit 320 and the data P2S circuit with the phase correction function 330. By such means, the frequency multiplier 310 is more flexible compared to the display PLL 120 of FIG. 1, and the spread spectrum output function can be integrated to the frequency synthesizer circuit, so as to reduce a cost of adding an additional spread spectrum circuit.

Thereafter, the display signal digital circuit 320 generates the display signals hs, vs, de, rgb and the display clock signal clk_1x according to the first frequency multiplication clock signal clk_1x_p. Then, the data P2S circuit with the phase correction function 330 transmits the serial clock signal tx_clk and the serialized serial data signal tx_data to the transmitting circuit 340 with reference of the display clock signal clk_1x and the second frequency multiplication clock signal clk_7x, so as to achieve the high speed transmission. Since the display clock signal clk_1x and the second frequency multiplication clock signal clk_7x do not have a phase locking relationship, the data P2S circuit with the phase correction function 330 includes an adjustment structure, which is used for adjusting the serial data signal tx_data and the serial clock signal tx_clk, and controlling a transmitting time of the serial data signal tx_data transmitted according to a clock of the second frequency multiplication clock signal clk_7x.

According to the LVDS output stage 300, in an embodiment, the first frequency multiplication clock signal clk_1x_p and the second frequency multiplication clock signal clk_7x are provided by a frequency multiplier of a system including the LVDS output stage 300.

In another embodiment, the first frequency multiplication clock signal clk_1x_p and the second frequency multiplication clock signal clk_7x are provided by the frequency multiplier 310 of the LVDS output stage 300. The frequency multiplier 310 generates the first frequency multiplication clock signal clk_1x_p and the second frequency multiplication clock signal clk_7x according to the reference clock signal Sref, wherein the reference clock signal Sref can be a clock signal provided to the display signal digital circuit by a former stage, or can be an independent reference clock generated by the system, which can all be applied to the output stage structure of the present embodiment.

Figure 4:
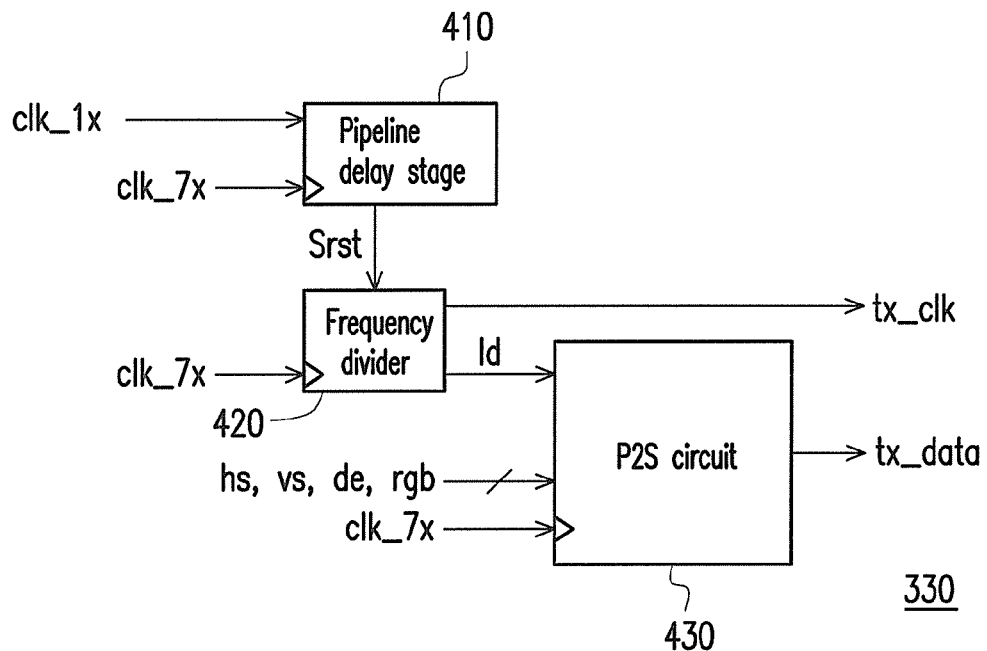
FIG. 4 is a diagram illustrating an example of a data P2S circuit with a phase correction function of FIG. 3.

FIG. 4 is a block schematic diagram illustrating an example of a data P2S circuit, which can be applied to the LVDS output stage 300 of FIG. 3. Referring to FIG. 4, the data P2S circuit 330 includes a pipeline delay stage 410, a frequency divider 420, and a P2S circuit 430. The pipeline delay stage 410 receives the second frequency multiplication clock signal clk_7x and the display clock signal clk_1x, and samples the display clock signal clk_1x according to the second frequency multiplication clock signal clk_7x, so as to generate a reset signal Srst.

Figure 5:
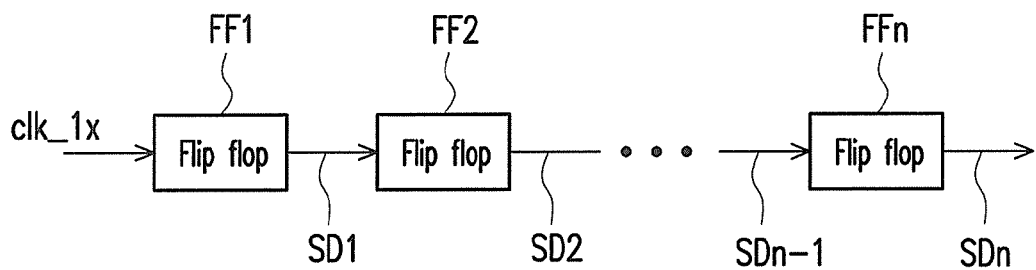
FIG. 5 is a diagram illustrating an example of a pipeline delay stage of FIG. 4.

For example, the pipeline delay stage 410 is formed by a plurality of flip flops FF1-FFn connected in serial, as that shown in FIG. 5, wherein n is a positive integer greater than 1. If the display clock signal clk_1x is "111000", and when it is transmitted to the pipeline delay stage 410, the first flip flop FF1 delays the "111000" for one bit, and outputs a first stage delay signal SD1, wherein the first stage delay signal SD1 is "1111000". Next, the first stage delay signal SD1 is transmitted to the second flip flop FF2. The second flip flop FF2 delays the first stage delay signal SD1, and outputs a second stage delay signal SD2, wherein the second stage delay signal SD2 is "11111000". Deduced by analogy, the $3^{rd}$-$n^{th}$ stage delay signals SD3-SDn are obtained, and detailed descriptions thereof are not repeated.

Then, the pipeline delay stage 410 generates the reset signal Srst according to back and forth of a certain stage of the $1^{st}$-$n^{th}$ stage delay signals SD1-SDn with reference to the second frequency multiplication clock signal (multiply-by-7 frequency synthesized signal) clk_7x, so that the frequency divider 420 can adjust a load signal (referred to as ld hereinafter) and the serial clock signal tx_clk output there from with reference of the reset signal Srst.

The frequency divider 420 is coupled to the pipeline delay stage 410, and generates the load signal ld and the serial clock signal tx_clk according to the reset signal Srst and the second frequency multiplication clock signal clk_7x. In the present embodiment, a dividing ratio of the frequency divider 420 relates to a multiplication ratio of the second frequency multiplication clock signal clk_7x. The P2S circuit 430 is coupled to the frequency divider 420, which is used for capturing the display signals hs, vs de and rgb according to the load signal ld and the second frequency multiplication clock signal clk_7x, so as to generate the serial data signal tx_data.

According to the above description, it is known that the pipeline delay stage 410 samples the display clock signal clk_1x according to the second frequency multiplication clock signal clk_7x, so as to generate the reset signal Srst. Then, the reset signal Srst is transmitted to the frequency divider 420 for resetting an internal state of the frequency divider 420, so as to change phases of the load signal ld and the serial clock signal tx_clk output from the frequency divider 420, so that the load signal ld can securely trigger the P2S circuit 430 to output the serial data signal tx_data.

In the present embodiment, the data P2S circuit with the phase correction function 330 is required to additionally consider a phase difference and a frequency difference between the display clock signal clk_1x and the second frequency multiplication clock signal clk_7x. Namely, the higher frequency the second frequency multiplication clock signal clk_7x has, the smaller the phase difference between the display clock signal clk_1x and the second frequency multiplication clock signal clk_7x that can be accepted by the structure without misoperations is.

Another embodiment is provided below to describe a method for generating the load signal ld to securely trigger the P2S without limitations of the phase difference and the frequency difference between the display clock signal clk_1x and the second frequency multiplication clock signal clk_7x. In the present embodiment, a determining circuit is added between the pipeline delay stage and the frequency divider to determine a positive edge section of a signal, especially, a positive edge section of the display clock signal. The pipeline delay stage receives the second frequency multiplication clock signal and the display clock signal, and samples the display clock signal according to the second frequency multiplication clock signal to generate a quantified signal. The determining circuit generates a shift signal according to the load signal ld and the quantified signal. The determining circuit is used for correctly determining a phase difference between the load signal ld and the display clock signal, and providing information to the frequency divider, so that the frequency divider can determine a time of sending the load signal ld, so as to securely sample the display signals (for example, the horizontal sync signal hs, the vertical sync signal vs, the data enable signal de, and the three basic color signal rgb, as that shown in FIG. 6.

Figure 6:
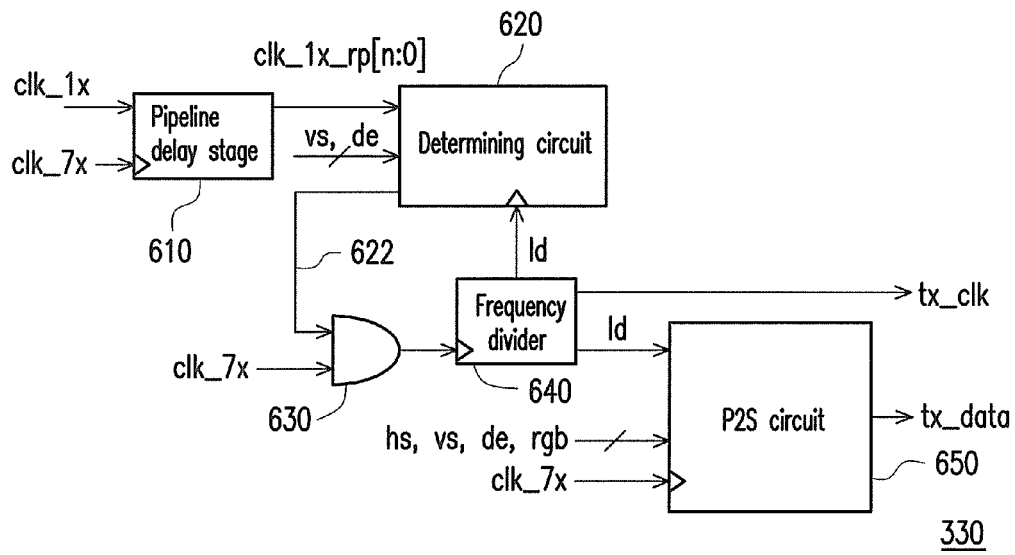
FIG. 6 is another example of a data P2S circuit with a phase correction function of FIG. 3.

FIG. 6 is another example of the data P2S circuit with the phase correction function of FIG. 3. Referring to FIG. 6, the data P2S circuit with the phase correction function 330 includes a pipeline delay stage 610, a determining circuit 620, an AND gate 630, a frequency divider 640 and a P2S circuit 650.

The pipeline delay stage 610 receives the display clock signal clk_1x and the second frequency multiplication clock signal clk_7x, and samples the display clock signal clk_1x according to the second frequency multiplication clock signal clk_7x, so as to generate a quantified signal clk_1x_rp[n:0]. Wherein, the quantified signal clk_1x_rp[n:0] is generated at a positive edge section of the display clock signal clk_1x.

The frequency divider 640 is coupled to the AND gate 630, and is used for generating the load signal ld and the serial clock signal tx_clk according to the reset signal Srst. In the present embodiment, the frequency divider 640 is a divided-by-7 divider. The P2S circuit 650 is coupled to the frequency divider 640, and is used for capturing the display signals hs, vs, de and rgb according to the load signal ld and the second frequency multiplication clock signal clk_7x, so as to generate the serial data signal tx_data. The AND gate 630 receives the second frequency multiplication clock signal clk_7x and a shift signal 622, and performs an AND operation to the second frequency multiplication clock signal clk_7x and the shift signal 622 to generate the reset signal Srst.

The determining circuit 620 is coupled to the pipeline delay stage 610 and the frequency divider 640, and is used for generating the shift signal 622 according to the load signal ld and the quantified signal clk_1x_rp[n:0]. In the present embodiment, the determining circuit 620 is mainly used for correctly determining a phase difference between the load signal ld and the display clock signal clk_1x, and providing information to the frequency divider 640 for adjustment, so as to securely sample the display signals hs, vs, de and rgb.

For example, the frequency divider 640 is initially in a free run state, and generates the load signal ld in every 7 cycles of the second frequency multiplication clock signal clk_7x (multiply-by-7 frequency synthesized signal), and sends the load signal ld to the determining circuit 620. When the determining circuit 620 receives the load signal ld, it simultaneously receives the quantified signal clk_1x_rp[n:0].

When the load signal ld is generated, the effective sections with signals of "1" of the quantified signal clk_1x_rp[n:0] fall in a critical region (for example, a time section when the quantified signal clk_1x_rp[n:0] is in a transition state, for example, the quantified signal clk_1x_rp[n:0] is transited from logic 0 to logic 1), and the determining circuit 620 generates the shift signal 622 (for example, a signal with a cycle of the second frequency multiplication clock signal clk_7x) with the logic 0 to the AND gate 630. Now, the AND gate 630 generates the reset signal Srst with the logic 0 to the frequency divider 640, so that one clock pulse of the second frequency multiplication clock signal clk_7x is missed in the trigger clock signal of the frequency divider 640. Therefore, when the frequency divider 640 outputs the load signal ld for a next time, one clock cycle of the second frequency multiplication clock signal clk_7x is delayed.

During a next operation cycle (i.e. 7 cycle lengths of the second frequency multiplication clock signal clk_7x) of the display clock signal clk_1x, the above algorithm is repeated until the load signal ld is generated, the effective sections with signals of "1" of the quantified signal clk_1x_rp[n:0] fall in a secure region (i.e. the quantified signal clk_1x_rp[n:0] is not transited), and the determining circuit 620 generates the shift signal 622 with the logic 1, i.e. the second frequency multiplication clock signal clk_7x sent to the frequency divider 640 is no longer adjusted, so that the load signal ld is adjusted to be secure relative to the display clock signal clk_1x.

Moreover, the determining circuit 620 can also adjust a state of the load signal ld according to the display signals vs and de. Wherein, the display signals vs and de can be used to define a time section of generating the load signal ld. Namely, regarding the display signals vs and de, the above time section can be defined in a data blank time section (a H blank time section and a V blank time section) of the display signal, so that the adjusting mechanism does not influence the clock signals of the active time section of the display data, and meanwhile the determining circuit 620 may have more adjustment flexibility.

Figure 7:
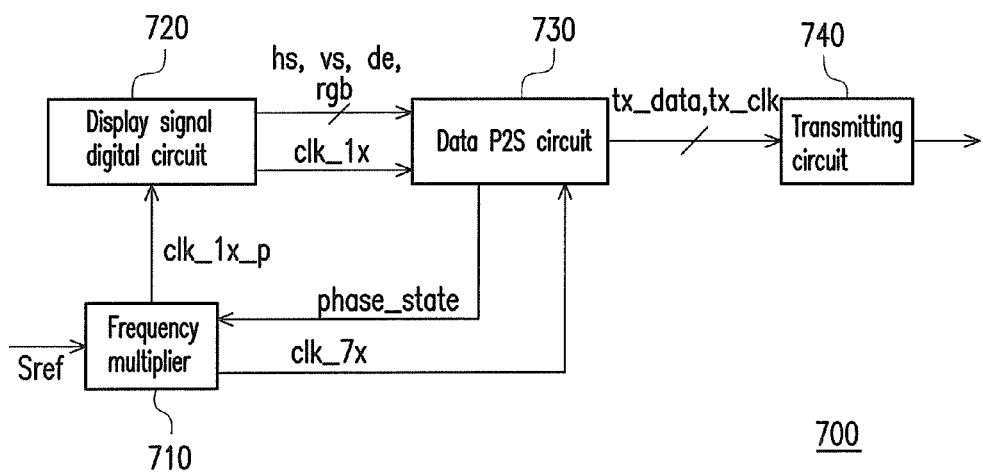
FIG. 7 is a block diagram illustrating a LVDS output stage according to another embodiment of the present invention.

FIG. 7 is a block diagram illustrating a LVDS output stage according to another embodiment of the present invention. Referring to FIG. 7, the LVDS output stage 700 includes a frequency multiplier 710, a display signal digital circuit 720, a data P2S circuit 730 and a transmitting circuit 740. Operations of the frequency multiplier 710, the display signal digital circuit 720, and the transmitting circuit 740 are similar to the frequency multiplier 310, the display signal digital circuit 320, and the transmitting circuit 340 of FIG. 3, and therefore detailed descriptions thereof are not repeated.

In the present embodiment, the data P2S circuit 730 can be a general data P2S circuit as that shown in FIG. 4, or a novel data P2S circuit as that shown in FIG. 6. The data P2S circuit 730 outputs a phase adjusting signal phase_state to the frequency multiplier 710. A method for generating the phase adjusting signal phase_state is as follows. The data P2S circuit 730 samples the second frequency multiplication clock signal clk_7x according to the display clock signal clk_1x, and transmits a leading or lagging information thereof (i.e. information that the phase of the display clock signal clk_1x leads the phase of the second frequency multiplication clock signal clk_7x, or information that the phase of the display clock signal clk_1x falls behind the phase of the second frequency multiplication clock signal clk_7x) to the frequency multiplier 710 through the phase adjusting signal phase_state.

Thereafter, the frequency multiplier 710 adjusts an output phase of the first frequency multiplication clock signal clk_1x_p according to the phase adjusting signal phase_state, and the phases of the display clock signal clk_1x and the second frequency multiplication clock signal clk_7x transmitted to the data P2S circuit with the phase correction function 730 are locked according to an adjusted delay amount of the first frequency multiplication clock signal clk_1x_p. Moreover, regarding a generation method of the load signal ld in internal of the data P2S circuit 730, the problem of phase synchronous between the second frequency multiplication clock signal clk_7x and the display clock signal clk_1x is unnecessary to be handled.

It should be noticed that if the data P2S circuit 730 is the novel data P2S circuit of FIG. 6, adjustment of the load signal ld in the internal of the data P2S circuit 730 is the same to the correction method of the data blank time section of the display signals vs and de transmitted to the determining circuit 620 of FIG. 6, so that a same correction effect of the embodiment of FIG. 6 is achieved.

According to the above descriptions, in the structures of the LVDS output stages 300 and 700, the frequency multipliers 310 and 710 are in charge of generating the required frequencies, and the data P2S circuits with the phase correction function 330 and 730 lock the required phases. Moreover, the frequency multipliers 310 and 710 also have the spread spectrum output function. Accordingly, the structures of the LVDS output stages 300 and 700 are simple and flexible, and meanwhile a cost of the whole system is reduced.

Regarding a general LVDS output stage, applications of the spread spectrum are twofold, one application is that a signal received by a front end is a spread spectrum clock signal (with a spread spectrum processing being performed), so that the spread spectrum processing is not required at a rear end, namely, the display PLL or the frequency multiplier at the rear end is unnecessary to generate the spread spectrum clock signal according to an input clock signal. Another application is on the contrary, by which the spread spectrum processing is not performed to the signal received by the front end, and the rear end circuit performs the spread spectrum processing. Regarding the two different applications of the spread spectrum, different structures (for example, the embodiments of FIG. 3 and FIG. 7) are provided, and in the novel data P2S circuit of FIG. 6, the phase difference between the first frequency multiplication clock signal clk_1x and the second frequency multiplication clock signal clk_7x that is caused by the spectrum spreading can be absorbed, so as to avoid misoperations, and meanwhile the spread spectrum serial data signal tx_data and serial clock signal tx_clk are output.

According to the above descriptions, in the present invention, the frequency multiplier provides the required frequency (the multiply-by-1 frequency synthesized signal and the multiply-by-7 frequency synthesized signal), and the data P2S circuit with the phase correction function locks the required phase (the load signal ld and the serial clock signal tx_clk). Moreover, the frequency multiplier also has the spread spectrum output function. By such means, the structure of the LVDS output stage can be simple and flexible, and meanwhile a cost of the whole system is reduced.

In the embodiments of FIG. 3 and FIG. 7, the frequency multiplier is used to replace the display PLL, though the concept of the present invention can also be applied to a structure having the display PLL and the conventional data P2S circuit, though a further design is required to increase a spread spectrum application range and amplitude of the LVDS output stage (a spread spectrum setting range of the display PLL is broader), which is described in detail below.

Figure 1:
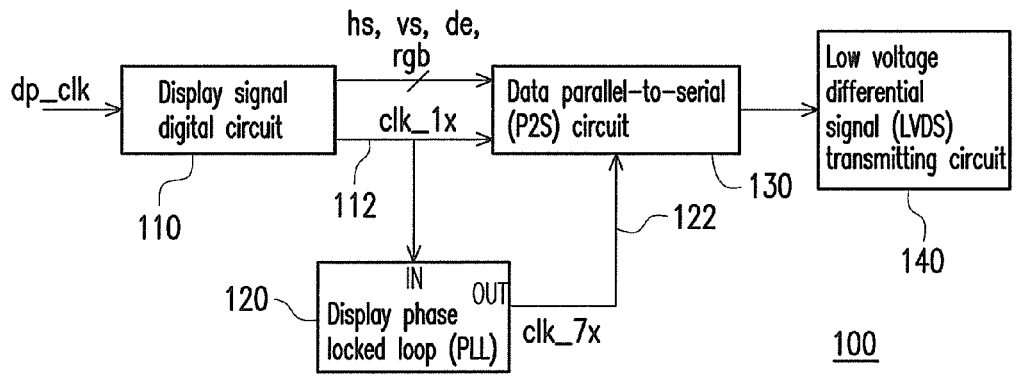
FIG. 1 is a block diagram illustrating a conventional low voltage differential signal (LVDS) output stage.
Figure 2:
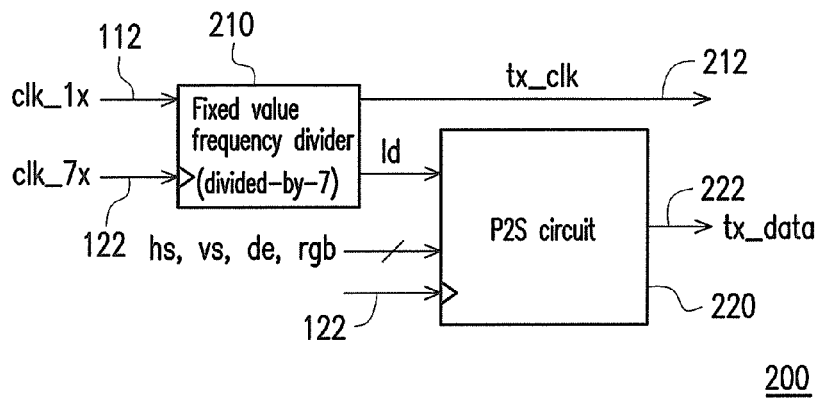
FIG. 2 is a block diagram illustrating a data P2S circuit of FIG. 1.

Regarding the display PLL 120 used in the conventional structure of FIG. 1, the conventional data P2S circuit 130 is applied, and the clock signal clk_1x is simultaneously connected to the display PLL 120 and the data P2S circuit 130. In the above two spread spectrum applications, when a spreading amplitude of the spectrum is great, the data P2S circuit 130 may have a misoperation. This is because a dramatic change of a phase difference between the clock signal clk_1x and the clock signal clk_7x results in a fact that the load signal ld cannot be fixedly generated at a fixed position in the 7 clock cycles of the clock signal clk_7x, and a reason thereof relates to a frequency and a phase limitations between the input clock signals clk_1x and clk_7x of the data P2S circuit 130.

Figure 8:
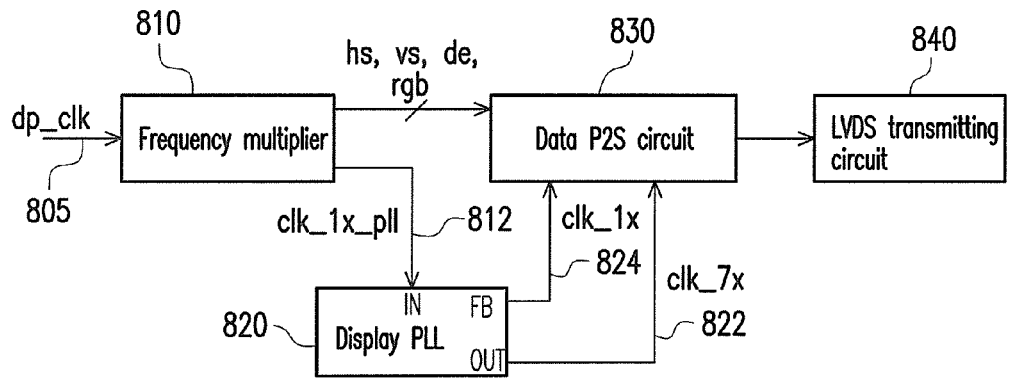
FIG. 8 is a schematic diagram illustrating a LVDS output stage according to another embodiment of the present invention.

In another embodiment of the present invention, a wiring method can be changed as that shown in FIG. 8. FIG. 8 is a schematic diagram illustrating a LVDS output stage according to another embodiment of the present invention. The LVDS output stage includes a display signal digital circuit 810, a display PLL 820, a data P2S circuit 830 and a LVDS transmitting circuit 840.

The display signal digital circuit 810 outputs display signals hs, vs, de, rgb and a lock signal clk_1x_pll according to a clock signal 805 (for example, dp_clk) provided by a former stage. Then, the clock signals clk_1x and clk_7x originally provided to the data P2S circuit are respectively changed to a signal 824 output from a feedback terminal FB and a signal 822 output from an output terminal OUT of the display PLL 820. A difference between the signal 824 output from the feedback terminal FB and the signal 822 output from the output terminal OUT is that the signal 824 output from the feedback terminal FB is a frequency dividing result of the signal 822 output from the output terminal OUT processed by the frequency divider. In case of the two spread spectrum applications, the two signals 822 and 824 are maintained synchronous, though the clock signal clk_1x_pll received by an input terminal IN of the display PLL 820 is not synchronous to the signal 822 output from the output terminal OUT of the display PLL 820. Therefore, according to the conventional wiring method of FIG. 1, a range of the spread spectrum operation of the data P2S circuit 130 is relatively narrow, though in the present embodiment, since the signals 824 and 822 are synchronous, the problem of limited spread spectrum application of the embodiment of FIG. 1 can be resolved.

Figure 9:
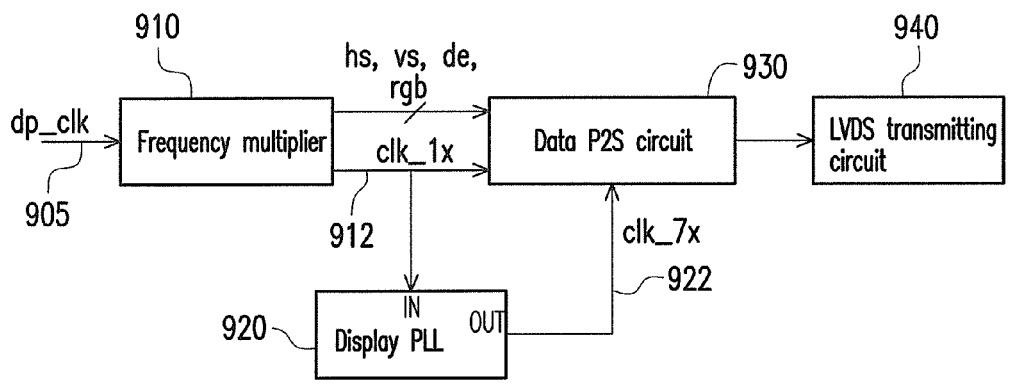
FIG. 9 is a schematic diagram illustrating a LVDS output stage according to another embodiment of the present invention.

In another embodiment, a different wiring method can be used. FIG. 9 is a schematic diagram illustrating a LVDS output stage according to another embodiment of the present invention. The LVDS output stage includes a display signal digital circuit 910, a display PLL 920, a data P2S circuit with a phase correction function 930 and a LVDS transmitting circuit 940. As shown in FIG. 9, the conventional data P2S circuit is replaced by the novel data P2S circuit, i.e. the data P2S circuit with the phase correction function of FIG. 6 is applied. Since the novel data P2S circuit has a characteristic of automatic phase correction, the problem of limited spread spectrum application of the embodiment of FIG. 1 can also be resolved, and a secure operating range of the phase difference between the clock signals clk_1x and clk_7x is broader than that of the embodiment of FIG. 8.

In the LVDS output stage of the present invention, the display PLL and the novel data P2S circuit are applied as that shown in FIG. 9. According to such combination, the spread spectrum application range and amplitude of the LVDS output stage is broader (i.e. a spread spectrum setting range of the display PLL is broader).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A low voltage differential signal (LVDS) output stage, comprising:
   a display signal digital circuit, generating a display signal and a display clock signal synchronous to each other according to a first clock signal having a first frequency;
   a data parallel-to-serial (P2S) circuit, sampling the display signal according to a second clock signal having a second frequency, so as to generate a serial data signal and a serial clock signal, wherein the first frequency of the first clock signal and the second frequency of the second clock signal have a multiplication relationship, the data P2S circuit comprises an adjustment structure for adjusting the serial clock signal according to the display clock signal and the second clock signal, and controlling a transmitting time of the serial data signal transmitted according to a clock of the second clock signal; and a transmitting circuit, connected to the data P2S circuit, for outputting the serial data signal and the serial clock signal to serve as outputs of the LVDS output stage, wherein the adjustment structure comprises a pipeline delay stage, receiving the second clock signal and the display clock signal, and sampling the display clock signal according to the second clock signal, so as to generate a quantified signal;

a determining circuit, connected to the pipeline delay stage, for determining a positive edge section of the display clock signal to determine a phase difference between the load signal and the display clock signal, so as to adjust a shift signal; and a frequency divider, receiving a signal, outputting the serial clock signal after performing a frequency dividing operation, and outputting a load signal, wherein the signal is generated according to the second clock signal and the shift signal.

2. The LVDS output stage as claimed in claim 1, further comprising a frequency multiplier for generating the first clock signal and the second clock signal according to a reference clock.

3. The LVDS output stage as claimed in claim 2, wherein the reference clock is a clock signal provided to the display signal digital circuit by a front stage device.

4. The LVDS output stage as claimed in claim 2, wherein the reference clock is generated by a system comprising the LVDS output stage.

5. The LVDS output stage as claimed in claim 1, wherein the first clock signal and the second clock signal are provided by a frequency multiplier of a system comprising the LVDS output stage.

6. The LVDS output stage as claimed in claim 1, wherein the determining circuit receives a vertical sync signal and a data enable signal in the display signal to adjust a time section for triggering the load signal, so that the time section falls within a data blank time section of the display signal.

* * * * *